W. A. HAGERMAN.
HOLDBACK.
APPLICATION FILED FEB. 24, 1911.

1,022,626.

Patented Apr. 9, 1912.

WITNESSES
Jas. K. M'Cathran
H. F. Totten

W. A. Hagerman INVENTOR
BY
C. G. Siggers
ATTORNEY

UNITED STATES PATENT OFFICE.

WILLIAM ALEXANDER HAGERMAN, OF LONDON, ONTARIO, CANADA, ASSIGNOR OF ONE-HALF TO WESLEY J. HILL, OF LONDON, CANADA.

HOLDBACK.

1,022,626.

Specification of Letters Patent. Patented Apr. 9, 1912.

Application filed February 24, 1911. Serial No. 610,533.

*To all whom it may concern:*

Be it known that I, WILLIAM A. HAGERMAN, a subject of the King of Great Britain, residing at London, in the county of Middlesex and Province of Ontario, Canada, have invented a new and useful Holdback, of which the following is a specification.

My invention relates to new and useful improvements in the construction of the attachments to the shafts of a vehicle and to the harness ordinarily termed "holdbacks" by means of which buckles, snaps, and the cumbersome wrapping of the shafts is obviated, and an easily attached and automatically detached holdback is provided.

The principal object of my invention is to provide a holdback construction so connected to the harness and shafts of a vehicle, that upon the unhitching of the traces and the leading of the draft animal from the shafts, the latter will not be permitted to drop to the ground until after the holdback has been disengaged from the shafts.

Another and important object is to provide a holdback construction attached to the top side of a shaft and connected to the harness in such a manner that the breeching will be held in a straight line above the shafts and not permitted to sag and chafe the flank of the draft animal.

With these and other objects in view, my invention consists in the construction and novel combination of parts hereinafter fully described, illustrated in the accompanying drawing, and pointed out in the claims hereto appended; it being understood that various changes in the form, proportion, size and minor details of construction, within the scope of the appended claims, may be resorted to without departing from the spirit or sacrificing any of the advantages of this invention.

Figure 1:
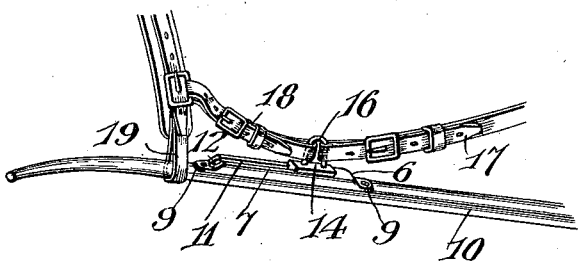
Figure 2:
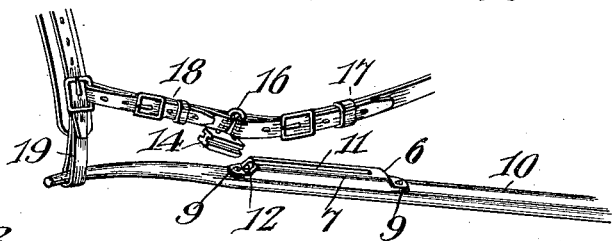
Figure 3:
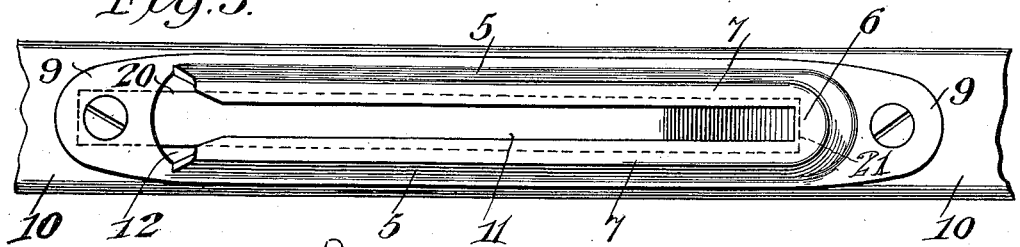
Figures 5, 6:
Figure 4:
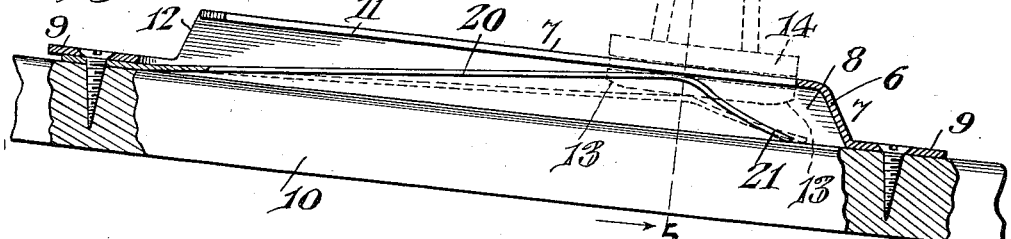

In the drawing:—Figure 1 represents a side view of my improvement as connected to one of a pair of vehicle shafts, and showing the parts in normal position for operation. Fig. 2 is a similar view to Fig. 1, but showing the holdback attachment detached from the shaft and the shaft tug still engaging the end of the shaft. Fig. 3 is a top plan view of the slotted holdback iron attached to the shaft. Fig. 4 is a longitudinal section of the holdback iron, showing the strap-carrying slide in dotted lines. Fig. 5 is a section on the line 5—5 of Fig. 4. Fig. 6 is a perspective view of the strap-carrying slide detached.

Similar characters of reference refer to similar parts throughout the several views.

The holdback comprises an elongated plate 7 of any suitable metal, formed with a longitudinally disposed off-set chamber or pocket 8, projecting outwardly from said plate, and terminating short of the ends thereof, thus providing ears or extended flat portions 9 at each end of the plate beyond the pocket or chamber, said ears having openings through which suitable fastening means are inserted to attach the said plate to the upper side of a shaft 10.

The chamber or pocket 8 is composed of opposite side walls 5 and an end wall 6, the said side walls being turned inwardly toward each other but spaced apart so as to define a longitudinal slot 11. This slot is closed at its rear end by the end wall 6, and is open at the front end 12, facing the front end of the shafts. At the front end the slot is provided with beveled or flared edges, which facilitate the insertion of a slide block 14. The slide block 14 is preferably oblong in shape and is provided on the opposite sides thereof with longitudinal grooves 15, which permit it, after it shall have been introduced into the open end 12, to be slid along the slot 11. The inwardly turned edges of the walls of the chamber engage with the grooves and preclude the removal of the slide block, except through the open end 12. The slide block is further provided on its upper face with an upstanding U-shaped loop or eye 16, to one side or arm of which is connected the holdback strap 17, and to the other side or arm is attached a short draw strap 18, which connects the slide block with the back band from which depends the shaft loop or strap 19, supporting the front end of the shaft.

The underside of the slide block 14 is beveled as at 13 at each end, providing an easy contact with a flat retaining spring 20, when the said block is inserted in the slot 11. The spring 20 is located within the chambered portion of the plate, and is held in position at the open end thereof by the same fastening means that secures the plate to the shaft. The spring is a little wider than the slot 11 so as to avoid projecting out of the slot, the said spring extending the full length of the slot in an upwardly inclined direction until it touches the inner side of the top of the chamber near the closed end of the slot, and is then bent downwardly so as to bear at its free end 21 against the shaft.

The slide block 14, which is carried by straps 17 and 18, is inserted in the slot 11 of the chambered plate, and the beveled lower edge of the block contacts with the spring 20 and as the block is forced toward the closed end of the slot, pressure will be put on the top face of the spring and the latter will be pressed down as indicated in dotted lines (Fig. 4). The pressure of the spring against the block, when the latter reaches the position shown in dotted lines, Fig. 4, causes the block to frictionally bind in the walls of the slot, but at the same time, the block may be easily extracted by a forward pull on the draw strap 18.

To provide for automatically disengaging the hold-back strap 17 and slide block 14 from the chambered plate attached to the shafts, when the horse is unhitched and led forward, I have connected the front end of the hold-back strap 17 with one side of the loop or eye 16, and the other side of the loop or eye 16 with the shaft loop 19 by a short connecting draw strap 18, whereby it is obvious that when the traces of the harness are disengaged and the horse is led forward, the slide block 14 will receive a direct pull from the shaft 18 and be drawn out of the slot 11 of the plate 7, before the thill supporting loop or strap 19 leaves the end of the shaft. This operation is clearly shown in Fig. 2 of the drawing. While the particular construction of the chambered plate has been specified and is regarded as possessing sufficient novelty to be included in the claims, it is obvious that I should not be limited to the exact construction of this part, for the principal feature of my invention resides in the connection of both the holdback strap and the draw strap to the loop on the slide block, whereby the operation hereinbefore described is permitted to take place.

It will be noted that the spring 20, which bears against the underside of the slide block, imparts a frictional resistance to the movement of said block from its normal or retracted position, as shown in Fig. 4. The strap 18 is so adjusted that its length is less than the distance from the outer end of the plate 7 to the end of the shaft.

Having thus fully described my invention, what I claim as new and desire to secure by Letters Patent, is:—

1. The combination of an elongated guide plate adapted to be attached to the shaft of a vehicle and having its guide open at its front end and closed at its rear end, a slide block mounted and movable in said plate and removable from the open front end of the guide by sliding it longitudinally and forwardly of the shaft, means for providing a frictional resistance to the forward movement of said block from its normal position at the rear closed end of the guide plate, a holdback strap, a draw strap, a back band, and a shaft loop or tug, means for connecting the front end of the draw strap to the back band, and means for connecting the inner ends of both the holdback strap and the draw strap to the slide block so that the latter is carried by both straps, the length of the draw strap being less than the distance between the front end of the guide of the guide plate and the front end of the shaft.

2. The combination of a chambered and slotted plate adapted to be attached to the upper side of the shaft of a vehicle and open at its front end and closed at its rear end, a slide block adapted to slide in said slotted plate and removable through the open end thereof by sliding it longitudinally of the shaft, a vertically disposed rigid loop or eye attached to and projecting from the upper side of said slide block, a holdback strap connected to the rear side of said loop or eye, a draw strap connected to the front side of said loop or eye, a back band, a shaft loop or tug, means for connecting the draw strap at its front end to the back band, the distance between the open front end of the plate and the front end of the shaft being greater than the length of the draw strap, whereby the said slide block will be disengaged from the said plate before the shaft loop is disconnected from the end of the shaft.

In testimony, that I claim the foregoing as my own, I have hereto affixed my signature in the presence of two witnesses.

WILLIAM ALEXANDER HAGERMAN.

Witnesses:
LEONARD C. JARVIS,
JOS. DERTINGER.

---

Copies of this patent may be obtained for five cents each, by addressing the "Commissioner of Patents, Washington, D. C."